UNITED STATES PATENT OFFICE.

AUGUST KLAGES AND HERMANN VOLLBERG, OF SALBKE, GERMANY.

PROCESS OF MAKING CHLOROSULFONIC ACID.

1,013,181.  Specification of Letters Patent.  Patented Jan. 2, 1912.

No Drawing.   Application filed July 25, 1910.   Serial No. 573,641.

*To all whom it may concern:*

Be it known that we, AUGUST KLAGES and HERMANN VOLLBERG, both subjects of the German Emperor, and residents of Salbke, in the Province of Saxony, Kingdom of Prussia, German Empire, have invented new and useful Improvements in the Process of Manufacturing Chlorosulfonic Acid, of which the following is a full, clear, and exact specification.

In the manufacture of chlorosulfonic acid it has hitherto been the custom to pass hydrochloric acid gas into a solution of sulfuric anhydrid in sulfuric acid (pyrosulfuric acid or fuming sulfuric acid) and to isolate the chlorosulfonic acid by distillation, or to cause dry hydrochloric acid gas to react with pure sulfuric anhydrid. The first process has the disadvantage that it involves a distillation for the separation of the chlorosulfonic acid and the second process also requires a distillation for obtaining sulfuric anhydrid in the gaseous or liquid form from fuming sulfuric acid. Moreover, when liquid sulfuric anhydrid is used, the hydrochloric acid gas must contain some 90 per cent. of hydrogen chlorid, because the sulfuric anhydrid is very easily carried forward by any air that may be contained in the hydrochloric acid gas, and is apt to polymerize in the pipes, thereby choking them. Again, when the liquid sulfuric anhydrid is used, great caution must be observed, because cooling the liquid mass is a very critical operation owing to the ease with which the liquid anhydrid changes to the solid polymer, which, unlike the liquid anhydrid, has but little tendency to react with hydrochloric acid; there are formed channels in the solidified mass through which the hydrogen chlorid passes. According to the present invention all these disadvantages are overcome by causing the reaction between the sulfuric anhydrid and the hydrochloric acid gas to occur in chlorosulfonic acid as a solvent. In this acid liquid or gaseous sulfuric anhydrid is very easily soluble, while the solid polymer is nearly insoluble. At the beginning of the process the solution of sulfuric anhydrid in chlorosulfonic acid is cooled down to about 0° C, at which temperature the solid anhydrid does not separate. When hydrochloric acid gas is introduced into such a solution, it is eagerly absorbed with formation of chlorosulfonic acid. The gas may contain air, and the solution may be cooled to such a degree that no sulfuric anhydrid is carried away by the air. During the process it is only necessary to prevent the increase in temperature of the solution caused by the introduction of the hydrochloric acid gas from exceeding 30° C. no special cooling being therefore necessary. It is also practicable to pass hydrochloric acid gas and gaseous sulfuric anhydrid together into chlorosulfonic acid, and in this case the anhydrid may be mixed with air; indeed the mixture coming directly from the contact apparatus and containing 7 per cent. by volume of the anhydrid, may be used. When performing the process in this manner special cooling is not necessary the hydrochloric acid gas and the gaseous sulfuric anhydrid being simply introduced into an apparatus similar to a Glover or Gay-Lussac tower in which the chlorosulfonic acid then dissolves the sulfuric anhydrid and is acted upon by the hydrochloric acid gas. In either case pure chlorosulfonic acid is obtained directly.

The process has the advantage over those previously applied, that no distillation is necessary and that gases containing air, as they are normally obtained, may be used. It is only necessary to have a certain quantity of chlorosulfonic acid, made in any manner, for starting the operation. The process has also the advantage that it can easily be made continuous, since the chlorosulfonic acid can be removed as it is formed.

What we claim is:—

1. The hereinbefore described process of manufacturing chlorosulfonic acid, which process consists in introducing hydrochloric acid gas and sulfuric anhydrid into chlorosulfonic acid.

2. The hereinbefore described process of manufacturing chlorosulfonic acid, which process consists in introducing hydrochloric acid gas into a solution of sulfuric anhydrid in chlorosulfonic acid while avoiding the presence of sulfuric acid.

3. The hereinbefore described process of manufacturing chlorosulfonic acid, which process consists in introducing hydrochloric acid gas and gaseous sulfuric anhydrid into chlorosulfonic acid at a moderate temperature.

In testimony, that we claim the foregoing as our invention, we have signed our names in presence of two subscribing witnesses.

AUGUST KLAGES.
HERMANN VOLLBERG.

Witnesses:
 LEOPOLD RUPRUTTUS,
 WILHELM BOLDT.